United States Patent [19]
Townsend

[11] Patent Number: 5,185,776
[45] Date of Patent: Feb. 9, 1993

[54] COVER FOR AN X-RAY CASSETTE

[76] Inventor: Boyd E. Townsend, 121 Hickory Trace Dr., Apartment 399, Nashville, Tenn. 37211

[21] Appl. No.: 740,066

[22] Filed: Aug. 5, 1991

[51] Int. Cl.⁵ .............................................. G03B 42/04
[52] U.S. Cl. .................................... 378/167; 378/177; 378/204
[58] Field of Search ............... 378/167, 177, 178, 179, 378/180, 182, 184, 204

[56] References Cited

U.S. PATENT DOCUMENTS

| | | | |
|---|---|---|---|
| 3,829,699 | 8/1974 | Anspach, Jr. | 378/167 |
| 3,843,041 | 10/1974 | Oliverius | 378/167 |
| 4,030,711 | 6/1977 | Gabriele . | |
| 4,067,525 | 1/1978 | Daniels . | |
| 4,156,145 | 5/1979 | Weatherholt | 378/177 |
| 4,464,780 | 8/1984 | Ruiz . | |
| 4,741,013 | 4/1988 | Evsek et al. | 378/167 |
| 4,961,502 | 10/1990 | Griffiths | 378/167 |

Primary Examiner—David P. Porta
Attorney, Agent, or Firm—Mark J. Patterson; Edward D. Lanquist, Jr.; I. C. Waddey, Jr.

[57] ABSTRACT

The present invention discloses a cover for an x-ray cassette which has a sleeve made of radiolucent material to receive an x-ray cassette. A foam pad is attached to the sleeve and aligned such that the foam pad covers the x-ray cassette. The foam pad is made of radiolucent material. The sleeve is made from a first sheet and second sheet of radiolucent material attached on three sides, which create a slot and a sleeve.

12 Claims, 1 Drawing Sheet

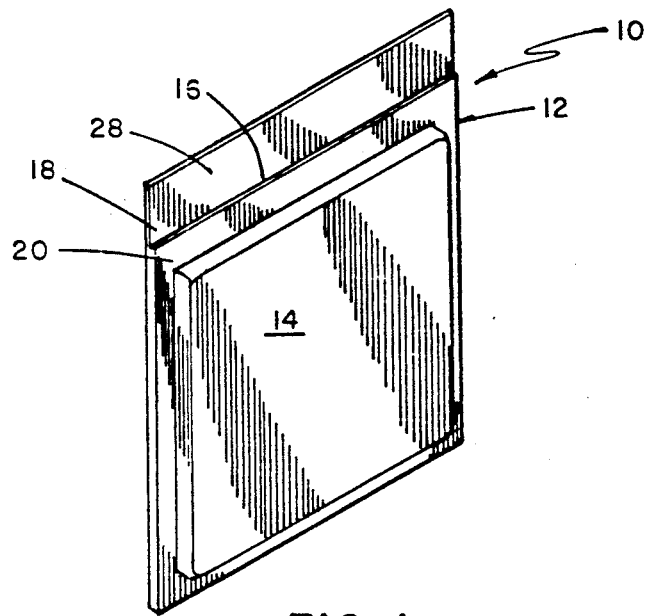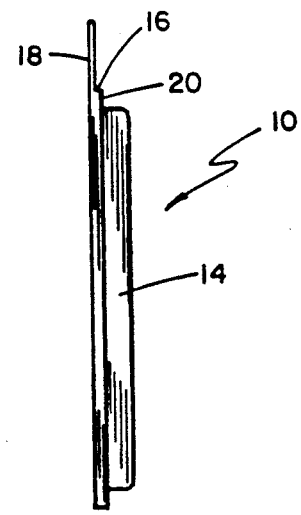
FIG. 1   FIG. 2
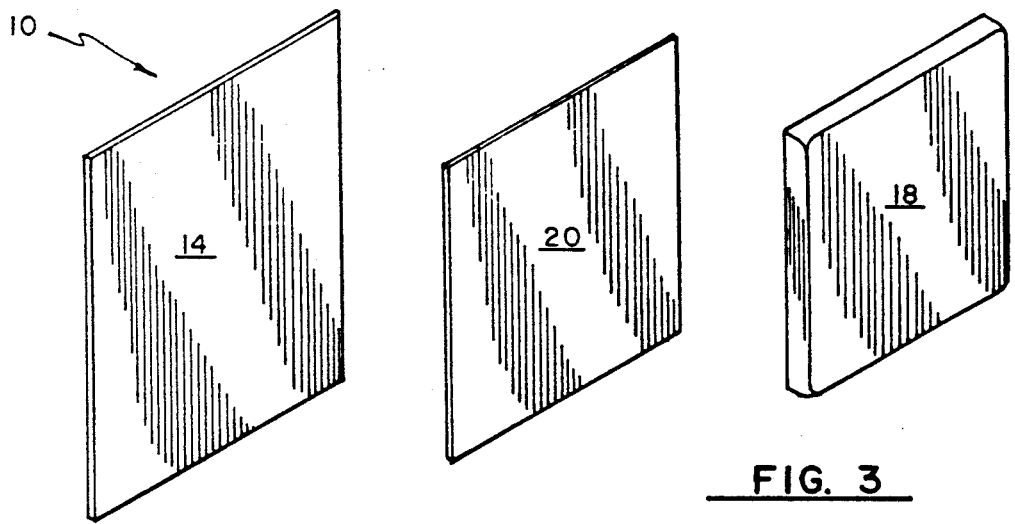
FIG. 3
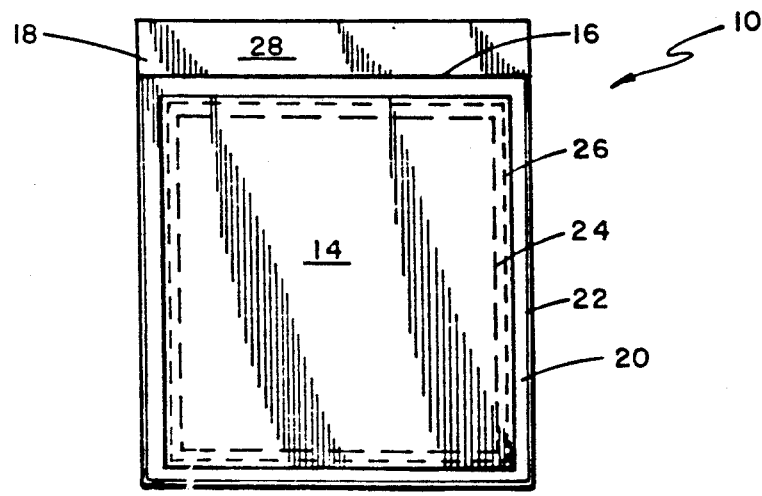
FIG. 4

COVER FOR AN X-RAY CASSETTE

BACKGROUND OF THE INVENTION

The present invention relates generally to a device for enveloping an x-ray cassette and more specifically to a sleeve for an x-ray cassette cover that is both disposable to prevent the spread of germs and cushioned for comfort.

It will be appreciated by those skilled in the art that x-ray cartridges are one of the few medical devices which are reused. It will further be appreciated by those skilled in the art that x-rays can be very impersonal and very uncomfortable to the patient. X-ray cassettes used in portable radiography and tabletop radiography are cold and hard. Often times, infants and small children must be placed on the x-ray cassette, thereby making the patient less cooperative and less comfortable. To this end, there have been several attempts to provide a more comfortable x-ray platform.

U.S. Pat. No. 4,464,780, issued to G. Ruiz on Aug. 7, 1984, discloses a pediatric restraint for x-ray photography. Although this device does provide a cushion upon which the patient can sit, the device does not provide a cushion proximate to the x-ray cartridge. Ruiz is also very complex, thereby making it difficult for disposability.

U.S. Pat. No. 4,030,719, issued to W. Gabriele et al. on Jun. 21, 1977, discloses a child immobilizing device for x-rays. This complex bed platform contains a recess into which the infant is placed. The child or infant is then strapped into the platform, thereby making the patient very uncomfortable. The complexity of the invention makes it difficult for disposability.

U.S. Pat. No. 4,067,525, issued to J. Daniels on Jan. 10, 1978, discloses a premature infant immobilizer and holding assembly for the nursery and radiological exposure. The Daniels invention has the same problems of the Gabriele et al. INVENTION which make it uncomfortable and economically impossible for disposal.

What is needed, then, is a cover for an x-ray cassette which is disposable, to prevent the spread of germs from patient to patient. This needed x-ray cassette cover must be simple and inexpensive to manufacture. This needed x-ray cassette cover must be comfortable by being both soft and warm. This needed cassette cover must be less traumatic for the patient to lie upon. This cover is presently lacking in the prior art.

SUMMARY OF THE INVENTION

In the present invention, a sleeve is made of a type of radiolucent material which is, in the preferred embodiment, plastic. The sleeve has a slot into which the x-ray cassette may be placed. On the exterior of the sleeve aligned over the area in which the x-ray cassette will reside, there is placed some type of cushion, such as a radiolucent foam pad. The foam pad may be secured to the plastic sleeve in any manner, including radiolucent glue, or may be glued such that the glue is placed around the exterior of a cassette in the cassette sleeve, so that it does not show up on the cassette during radiography.

Accordingly, an object of the present invention is to provide a cover for an x-ray cassette which is disposable, so that it will help prevent the spread of germs from patient to patient.

Still another object of the present invention is to provide a cover for an x-ray cassette which is easy to make and inexpensive.

Still another object of the present invention is to provide a cover for an x-ray cassette which is comfortable in that it is both soft and warm.

Still another object of the present invention is to provide a cover for an x-ray cassette that is not traumatic for a patient to lie upon.

BRIEF DESCRIPTION OF THE DRAWINGS

FIG. 1 is a plan view of the cover for an x-ray cassette of the present invention.

FIG. 2 is an end view of the cover for an x-ray cassette of the present invention.

FIG. 3 is an exploded view of the cover for an x-ray cassette of the present invention.

FIG. 4 is a plan view of the cover for an x-ray cassette of the present invention.

DESCRIPTION OF THE PREFERRED EMBODIMENT

Referring now to FIG. 1, there is shown generally at 10 the cover for an x-ray cassette of the present invention. As shown, foam pad 14 attaches to second sheet 20 of sleeve 12. First sheet 18 and second sheet 20 combine to form sleeve 12. Sleeve 12 can be formed such that first sheet 18 and second sheet 20 have no discernable seams. However, in the preferred embodiment, first sheet 18 is heat sealed to second sheet 20. In the preferred embodiment, first sheet 18 is slightly larger than second sheet 20 such that first sheet 18 extends beyond slot 16 to form flap 28 which enables sleeve 12 to be "closed" when cassette (24 in FIG. 4) resides in sleeve 12. Sleeve 12 is radiolucent such that sleeve 12 does not interfere with the radiography. Foam pad 14 attaches to second sheet 20. Foam pad 14 is also radiolucent and attached to second sheet in a variety of ways, including, in the preferred embodiment, glue. In the preferred embodiment, if glue (26 in FIG. 4) is not radiolucent, care should be taken so that glue 26 does not interfere with radiography.

Referring now to FIG. 2, there is shown another view of cover for x-ray cassette 10. As can be seen, second sheet 20 attaches to first sheet 18. Foam pad 14 then attaches to second sheet 20.

Referring now to FIG. 3, there is shown generally at 10 an exploded view of the cover for an x-ray cassette of the present invention. Second sheet 20 attaches to first sheet 18 on three sides, thereby leaving slot (16 in FIG. 1). Foam pad 14 then attaches to second sheet 20.

Referring now to FIG. 4, there is shown generally at 10 the cover for an x-ray cassette in more detail. First sheet 18 and second sheet 20 attach on three edges at sleeve seam 22. As stated earlier, in the preferred embodiment, heat sealing is used. However, any means of sealing can be used. In the preferred embodiment, plastic is used. However, any radiolucent material can be used. Foam pad 14 then attaches to second sheet 20 by, in the preferred embodiment, glue 26 shown in phantom in FIG. 4. Cassette 24 fits into slot 16 and resides between first sheet 18 and second sheet 20. Cassette 24 is aligned such that glue 26 does not interfere with radiography.

In the preferred embodiment, foam pad 14 is one-half inch thick.

Cover 10 can sized to fit any cassette size. However, generally, cassettes 24 are available in dimensions of 8"×10", 10"×12", 11"×14", and 14"×17".

When cassettes 24 are placed in sleeve 12, cassettes 24 can be placed on any radiography surface upon which any uncovered cassette may be placed.

Thus, although there have been described particular embodiments of the present invention of a new and useful "Cover for an X-ray Cassette", it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A cover for an x-ray cassette comprising:
   a. a plastic sleeve to envelope said cassette; and
   b. radiolucent foam padding aligned to fit over said cassette to cushion said cassette.

2. The device of claim 1 wherein said means to envelope said cassette cover is disposable.

3. The device of claim 1 wherein said means to envelope said cassette cover comprises a plastic sleeve.

4. The device of claim 3 wherein said plastic sleeve is disposable.

5. The device of claim 1 wherein said means to cushion said cassette enveloping means comprises radiolucent foam padding.

6. A cover for an x-ray cassette comprising:
   a. a first sheet of radiolucent material sized to cover said cassette, said first sheet having four edges;
   b. a second sheet of radiolucent material having four edges, three of said edges of said second sheet attached to three of said edges of said first sheet, thereby producing a sleeve and a slot; and
   c. a pad attached to said second sheet aligned to cover said cassette.

7. The device of claim 6 wherein said first sheet and said second sheet are radiolucent.

8. The device of claim 6 wherein said first sheet and said second sheet are attached by heat sealing.

9. The device of claim 6 further comprising a pad attached to said second sheet.

10. A cover for an x-ray cassette comprising:
    a. a sleeve having a slot for receiving said cassette; and
    b. a foam pad attached to said sleeve to cushion said cassette.

11. The device of claim 10 further comprising a flap.

12. The device of claim 10 wherein said cover is disposable.

* * * * *